US007675852B1

(12) United States Patent
Arundale et al.

(10) Patent No.: US 7,675,852 B1
(45) Date of Patent: Mar. 9, 2010

(54) SYSTEM AND METHOD OF PROVIDING BOUNDED DYNAMIC WAVEFORM ALLOCATION FOR SOFTWARE DEFINED RADIOS

(75) Inventors: Gregory A. Arundale, Marion, IA (US); Steven E. Koenck, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 691 days.

(21) Appl. No.: 11/515,266

(22) Filed: Sep. 1, 2006

(51) Int. Cl.
   *G08C 15/00* (2006.01)
(52) U.S. Cl. .................. 370/229; 455/418; 455/431
(58) Field of Classification Search .......... None
    See application file for complete search history.

(56) References Cited

U.S. PATENT DOCUMENTS

| 6,615,038 | B1 | 9/2003 | Moles et al. |
| 6,823,181 | B1 | 11/2004 | Kohno et al. |
| 6,937,877 | B2 | 8/2005 | Davenport |
| 6,954,636 | B2 | 10/2005 | Matsuo et al. |
| 7,218,123 | B1* | 5/2007 | Tsamis et al. ............... 324/658 |
| 2007/0178946 | A1* | 8/2007 | Palum et al. ................ 455/574 |

OTHER PUBLICATIONS

Joe Mitola, The Software Radio Architecture, May 1995, IEEE Communications Magazine, pp. 26-38.*

* cited by examiner

*Primary Examiner*—Ayaz R Sheikh
*Assistant Examiner*—Nicholas Sloms
(74) *Attorney, Agent, or Firm*—Matthew J. Evans; Daniel H. Barbieri (57) ABSTRACT

Described is a method of providing resource allocation for a software defined radio (SDR). The method comprises defining a current time window that is subdivided into sub time intervals, defining a committed time window that is subdivided into sub time intervals, and defining a future time widow that is subdivided into sub time intervals. The method also comprises determining the size of each of the time windows and the size and number of each of the sub time intervals based on the output of a priority arbitration function. Further, the method comprises determining changes in resource allocations in the sub time intervals of the future time window based on system requirements.

25 Claims, 4 Drawing Sheets

SYSTEM AND METHOD OF PROVIDING BOUNDED DYNAMIC WAVEFORM ALLOCATION FOR SOFTWARE DEFINED RADIOS

BACKGROUND

The invention described herein generally relates to Software Defined Radios (SDR) and SDR systems. In particular, a system and method of providing bounded dynamic waveform priority allocation for software defined radios is described.

Software Defined Radio methodology is rapidly gaining favor as a way to architect and design radio communication systems with greatly improved interoperability and ability to accommodate future waveform variants. SDR refers to wireless communication in which the transmitter modulation is generated or defined by a computer, and the receiver uses a computer to recover the signal intelligence. To select the desired modulation type, the proper programs are run by microcomputers that control the transmitter and receiver.

A typical voice SDR transmitter, such as may be used in mobile two-way radio or cellular telephone communication, includes the following stages: Microphone; Audio amplifier; Analog-to-digital converter (ADC) that converts the voice audio to digital data; Digital Signal Processor (DSP) to convert the digital data to a form for modulation; Modulator that impresses the digital intelligence onto a radio-frequency (RF) carrier; Series of amplifiers that boosts the RF carrier to the power level necessary for transmission; and Transmitting antenna. Typically, the ADC and Modulator functions are carried out by computer-controlled circuits whose parameters are determined by software, in an SDR. A typical data SDR replaces the microphone, Audio amplifier, and ADC front end components with a computing system providing a data stream to the DSP stage.

A typical receiver designed to intercept the above-described voice SDR signal may employ the following stages, essentially reversing the transmitter's action: Receiving antenna; Superheterodyne system that boosts incoming RF signal strength and converts it to a lower frequency; Demodulator that separates the baseband signal from the RF carrier; Digital signal processor to convert the baseband signal to a stream of digital data; Digital-to-analog converter (DAC) that generates a voice waveform from the digital data; Audio amplifier; and Speaker, earphone, and/or headset. A typical data SDR replaces the DAC, Audio amplifier, and speaker back end components with a computing system accepting a data stream from the DSP stage. Typically, the demodulator and DAC functions are carried out by computer-controlled circuits whose parameters are determined by software, in an SDR.

The most significant asset of SDR is versatility. Wireless systems employ protocols that vary from one service to another. Even in the same type of service, for example, cellular telephones, the protocol often differs from country to country. A single SDR set with an all-inclusive software repertoire may be used in any mode, anywhere in the world. Changing the service type, the mode, and/or the modulation protocol involves simply selecting and executing the requisite computer program. An ultimate SDR would be a single radio transceiver capable of playing the roles of cordless telephone, cell phone, wireless fax, wireless e-mail system, pager, wireless videoconferencing unit, wireless Web browser, Global Positioning System (GPS) unit, and other functions to be later developed, operable from any location on the surface or proximate the surface of the earth, and perhaps in space as well.

The United States Department of Defense (DoD) Joint Tactical Radio System (JTRS) initiative has established an Open Standard Architecture for implementation of military communication waveforms that is specifically intended to meet a subset of these objectives. Such Joint Tactical Radio Systems are available from Rockwell Collins, Inc. of Cedar Rapids, Iowa.

There is growing interest in applying an Open Standard SDR Architecture to commercial applications such as avionics communication, navigation and surveillance (CNS). The characteristics of commercial CNS waveforms are quite different from the military JTRS communication waveforms, and, in general, are less complex to implement. A key difference between military communications and commercial avionics are the requirements associated with safety. The safety requirements associated with commercial CNS avionics typically involve gaining approval for use (generally referred to as "certification") by the appropriate civil aviation authority, such as the Federal Aviation Administration (FAA) in the United States or the Joint Aviation Administration (JAA) in Europe. The safety requirements for the CNS functions typically address the integrity and availability, and for some functions, the continuity. Thus, it is desirable to provide an avionics commercial CNS system architecture that addresses the safety requirements while retaining compatibility with an appropriate SDR standard, preferably the Open Standard Architecture established by the DoD as part of the JTRS program.

Avionics onboard an aircraft include communication, navigation and surveillance functions. These functions provide flight crew members with the capability to communicate with ground-based facilities and control the flight of the aircraft in response to flight conditions according to flight plans. Avionics also provide passenger entertainment in airline operations.

In general, prior art avionics systems have included many dedicated pieces of equipment that each provide a function (also referred to as a waveform when radio communication is involved) to give flight crew members the ability to manually or automatically control the flight of an aircraft. Each piece of equipment (or radio) usually operates to some extent independently of the other pieces of equipment in the avionics system and performs a dedicated function throughout the entire flight. Examples of such separate pieces of equipment include a global positioning system (GPS) navigation device, a radio altimeter, a traffic alert collision avoidance system (TCAS) or a voice communication radio. Having separate dedicated pieces of equipment to perform these functions typically adds to the total equipment costs as well as the weight of the aircraft. Furthermore, having numerous separate dedicated pieces of equipment typically takes up much more volume or space, uses more power, requires more total cooling air, etc., than would be required with an integrated set of avionics equipment.

Some more recent avionics systems include one or more software defined radios (SDRs) instead of dedicated pieces of equipment. SDR essentially includes interconnected hardware and software components that are collectively capable of performing one or more avionics communication, navigation or surveillance function. As compared to the combination of multiple dedicated pieces of equipment, such SDRs are potentially less expensive to manufacture, are lighter, require less space, less power to operate, and potentially require less total cooling air.

Although avionics systems that include SDRs have the earlier-mentioned advantages over systems with dedicated pieces of equipment, in general, current avionics systems carry unutilized or under-utilized redundant equipment to meet function availability and continuity requirements during the phase of flight (dispatch, en-route, approach, etc.) where the function is used. While redundancy is necessary to meet safety critical aircraft availability requirements, excessive redundancy of limited-purpose equipment can burden the airplane infrastructure resources.

Conventionally commercial and military aircraft carry a large number of radios for specific communication, navigation and control needs. Software Defined Radios have the potential to decrease the number of radios needed on a given aircraft by changing the configuration of a radio to fit the communication need during specified times within the flight scenario. Due to certification concerns, the benefit of re-programmable modules may be limited to configurations validated during the system's qualification, verification and certification. This issue is likely to force the system to require a higher number of software definable radios than what would be necessary if the system had the freedom to change in a more dynamic way.

In particular, there is a need for SDR technology that allows a single set of hardware to perform multiple functions by software reconfiguration. Further, there is a need for reconfigurable systems that automatically and autonomously bound the dynamic behavior of the waveform allocation so that certification criteria can be met. Further still, there is a need for such a reconfigurable system that provides optimal assignments for SDR module functions.

SUMMARY

In a Software Defined Radio (SDR), a method for resource allocation is provided. The method comprises defining a current time window that is subdivided into sub time intervals, defining a committed time window that is subdivided into sub time intervals, and defining a future time widow that is subdivided into sub time intervals. The size of each of the windows and the size and number of the sub time intervals is based on the output of a priority arbitration function.

What is also provided is a method of dynamically scheduling resources in a software defined radio. The method comprises providing a priority arbitrator to define a schedule for changing resource allocations and determining when resources will be changed within at least one of a plurality of defined time subintervals of a committed time window and a future time window. The method also comprises reconfiguring at least one radio channel in accordance with the schedule. Further, the method comprises sending a test signal using the at least one radio channel and receiving the test signal by a second radio channel. Alternatively, the at least one radio channel may be verified by monitoring actual signals received by a second radio channel.

Further, what is provided is a software defined radio. The software defined radio comprises a modem at least partially defined by software running on a processor, an antenna group translator coupled to the modem, and at least two antennas coupled to the antenna group translator. The software defined radio also comprises a program stored in a memory and running on the processor, the program configured to define a committed time window and a future time window each being subdivided into sub time intervals. Further, the software defined radio comprises determining the changes in resource allocations in the sub time intervals of the future time window based on system requirements Alternative exemplary embodiments relate to other features and combination of features as may be generally recited in the claims.

BRIEF DESCRIPTION OF THE DRAWINGS

A better understanding of the features and advantages of the present invention will be obtained by reference to the following detailed description that sets forth illustrative embodiments by way of example only, in which the principles of the invention are utilized, and the accompanying drawings, of which.

DETAILED DESCRIPTION

Before describing in detail the particular improved system and method, it should be observed that the invention includes, but is not limited to a novel structural combination of conventional data/signal processing components and communications circuits, and not in the particular detailed configurations thereof. Accordingly, the structure, methods, functions, control and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

The disclosure relates, in general, to avionics communication, navigation and surveillance (CNS) systems that utilize software defined radios (SDRs). More specifically, the present invention relates to SDRs that are configured to minimize the number of avionics components and functions. Software defined radios (SDR) are characterized by software executing on microprocessors and/or digital signal processors, and configurations loaded into programmable hardware such as field programmable gate arrays (FPGAs). To facilitate software design, portability and interoperability, the Software Communications Architecture (SCA) may be used. The SCA was specifically defined by the United States Department of Defense to provide an abstraction layer between SDR waveform application software and the underlying hardware platform in the Joint Tactical Radio System. The elements of the SCA are a Portable Operating System Interface (POSIX), Common Object Request Broker Architecture (CORBA), and a set of services and utilities labeled Core Framework. Utilization of the SCA in radio communication systems insures interoperability and portability of these systems.

The platform abstraction provided by the SCA makes it possible to use a wide variety of microprocessors to host the SCA operating environment (OE). A basic requirement for the platform microprocessor is that it must provide sufficient computing performance to meet the real time requirements of the waveform being executed on the platform.

In accordance with an exemplary embodiment, the method and apparatus discussed may employ any kind of hardware to run the software embodying the invention, including but not limited to a personal computer, ARM processor, XScale processor, Digital Signal Processor (DSP), Application Specific Integrated Circuit (ASIC) or programmable platform ASIC, FPGA, General Purpose Processor (GPP), microprocessor, mainframe or dedicated circuit with memory, so that in general any compatible piece of hardware or virtual machine can be configured to run the software disclosed.

Thus, an exemplary method and apparatus for constructing the invention is a computing platform running a software program, which may be written in any computer language (such as C, C++, Ada, Perl, Java or the like), preferably an Object Oriented programming (OOP) language, run by a computer system having an operating system or other executive kernel code. The computer system typically has one or more processors, memory cooperating with the processor(s), which executes instructions stored in the memory, I/O means, and any necessary specialized hardware or firmware. Depending on the language used to construct and implement the software tool, the source code, object code and/or executables of the tool may have any number of classes, functions, objects, variables, templates, lines of code, portions of code, components and constructs (collectively and generally, "a process step", "step", "block", "functional module" or "software module") to carry out the invention in successive stages as described and taught herein, and may be either a standalone software application, or employed inside of or called by another software application, or as firmware. The software process or software module may be constructed so that one portion of code in the application performs a plurality of functions, as for instance in Object Oriented programming (e.g., an overloaded process). The converse is also true, in that a plurality of portions of code could perform a plurality of functions, and still be functionally the same as a single portion of code. At any stage of the process of the invention, intermediate values, variables and data may be stored for later use by the program. In addition, the binary executable or source code data comprising the software of the invention may reside on computer readable storage medium (e.g., a magnetic disk, which may be portable, such as a hard drive, floppy drive; memory (e.g., flash RAM); or a DVD or CD-ROM disk).

Figure 1:
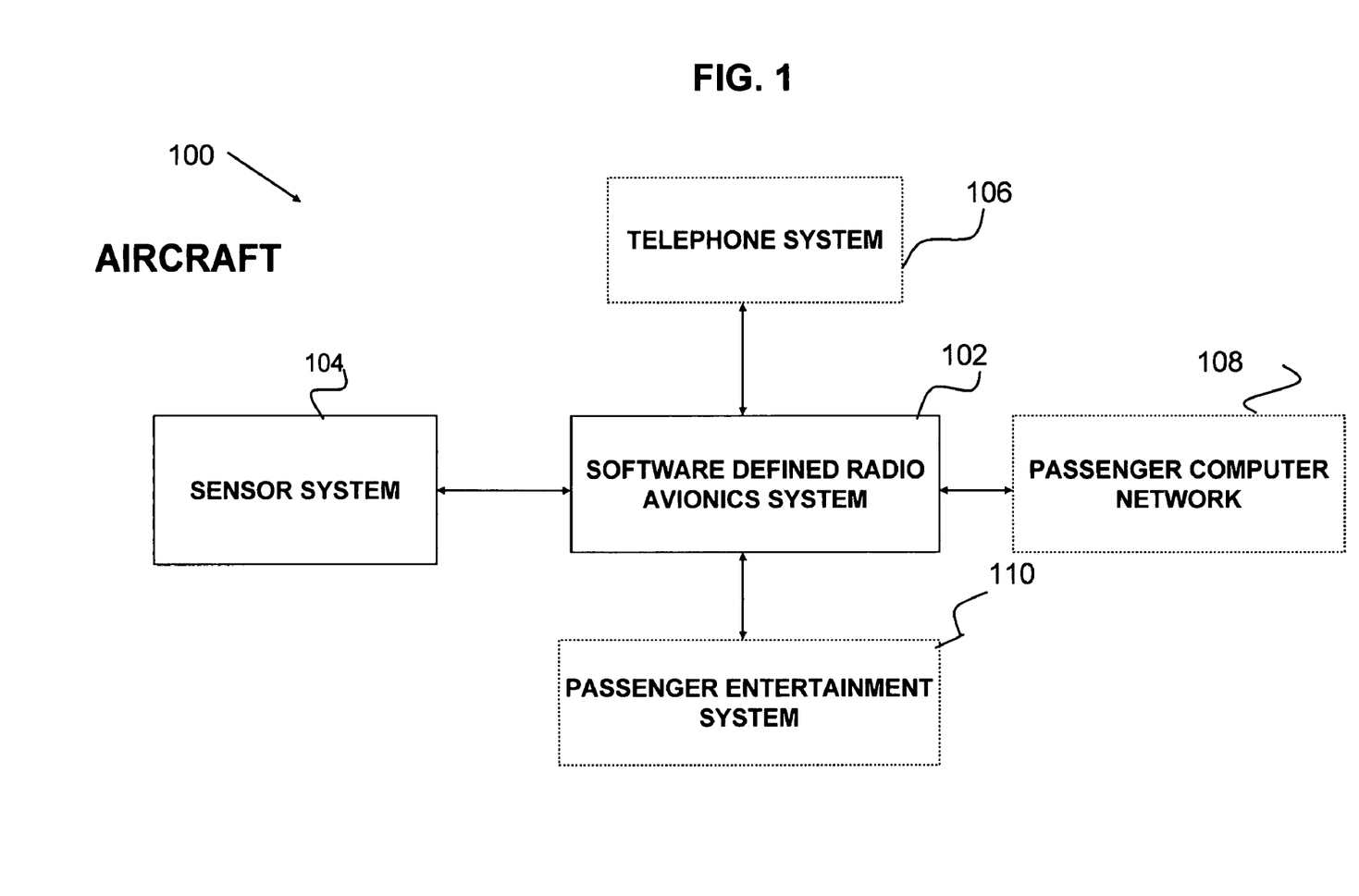
FIG. 1 is an exemplary block diagram of an aircraft having a software defined radio system on board, in which the invention is embodied.

FIG. 1 is a diagrammatic illustration of an aircraft 100 that employs a SDR avionics system of the present invention. In the exemplary embodiment depicted in FIG. 1, hardware, software and firmware systems onboard aircraft 100 include SDR avionics system 102, a sensor system 104, a telephone system 106, a passenger computer network 108 and a passenger entertainment system 110. Systems 106, 108 and 110 are optional and are therefore represented by dashed lines in FIG. 1. SDR avionics system 102, which is connected to the other example aircraft systems shown in FIG. 1, implements functions that provide flight crew members the capability to communicate with ground-based facilities and control the flight of the aircraft in response to flight conditions according to flight plans. SDR avionics system 102 can also provide communications, processing, monitoring, etc. for the sensor system 104, telephone system 106, passenger computer network 106, and passenger entertainment system 110. Details regarding components of, and avionics functions carried out by, SDR avionics system 102 are described further below.

Sensor system 104, which may include air temperature and pressure sensors, wind condition sensors, one or more antenna groups, etc., provides SDR avionics system 102 with inputs related to flight conditions, for example. Telephone system 106, which includes telephones and/or telephone system infrastructure for passenger use, can be connected to SDR avionics system 102, which, in addition to being able to carry out the above-mentioned functions, can also monitor telephone system 106 and detect and/or report any malfunctions in system 106 to flight crew members, for example. Telephone system 106 may include wireless telephone infrastructure such as a cellular telephone network, whereby the SDR avionics system 102 serves as a cellular base station so that passengers may use their personal cellular telephones in the aircraft cabin. Passenger computer network 108 may include a system that provides passengers with the capability to connect to the Internet. Network 108 may also be an intranet system or subsystem including an aircraft specific intranet, a part of an airline intranet, part of an intranet for a group of airlines or the like. SDR avionics system 102 may be configured to monitor network 108 and report any network malfunctions, for example. Passenger entertainment system 110, which may include, for example, any suitable audio and/or video entertainment system, can also be monitored by SDR avionics system 102. In some embodiments, rather than simply monitoring operations of optional systems 106, 108 or 110, SDR avionics system 102 can perform some of the functions of these systems during particular phases of flight, including for example, communications with off-aircraft ground or satellite equipment.

Figure 3:
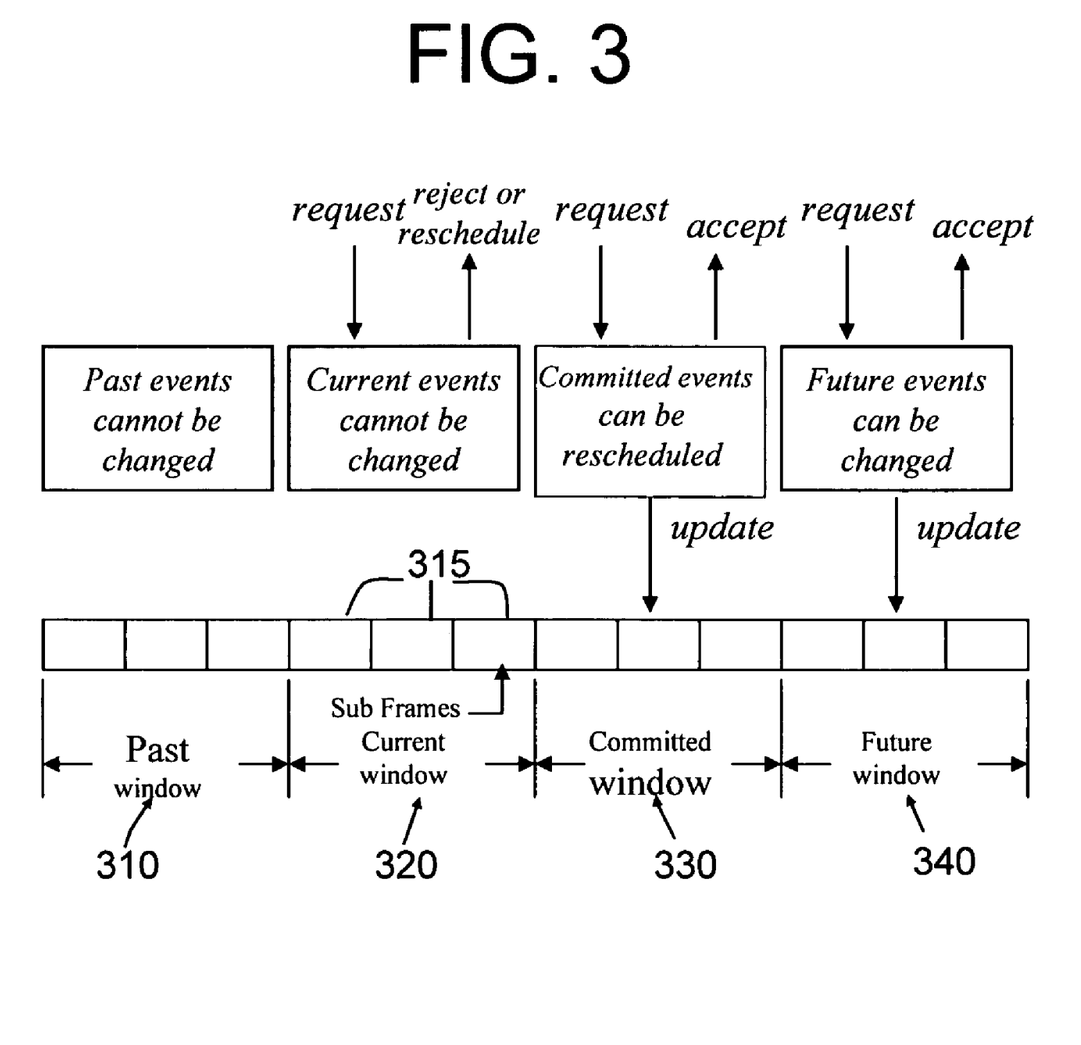
FIG. 3 is an exemplary diagram of an exemplary process of dynamic resource scheduling for a SDR.
Figure 4:
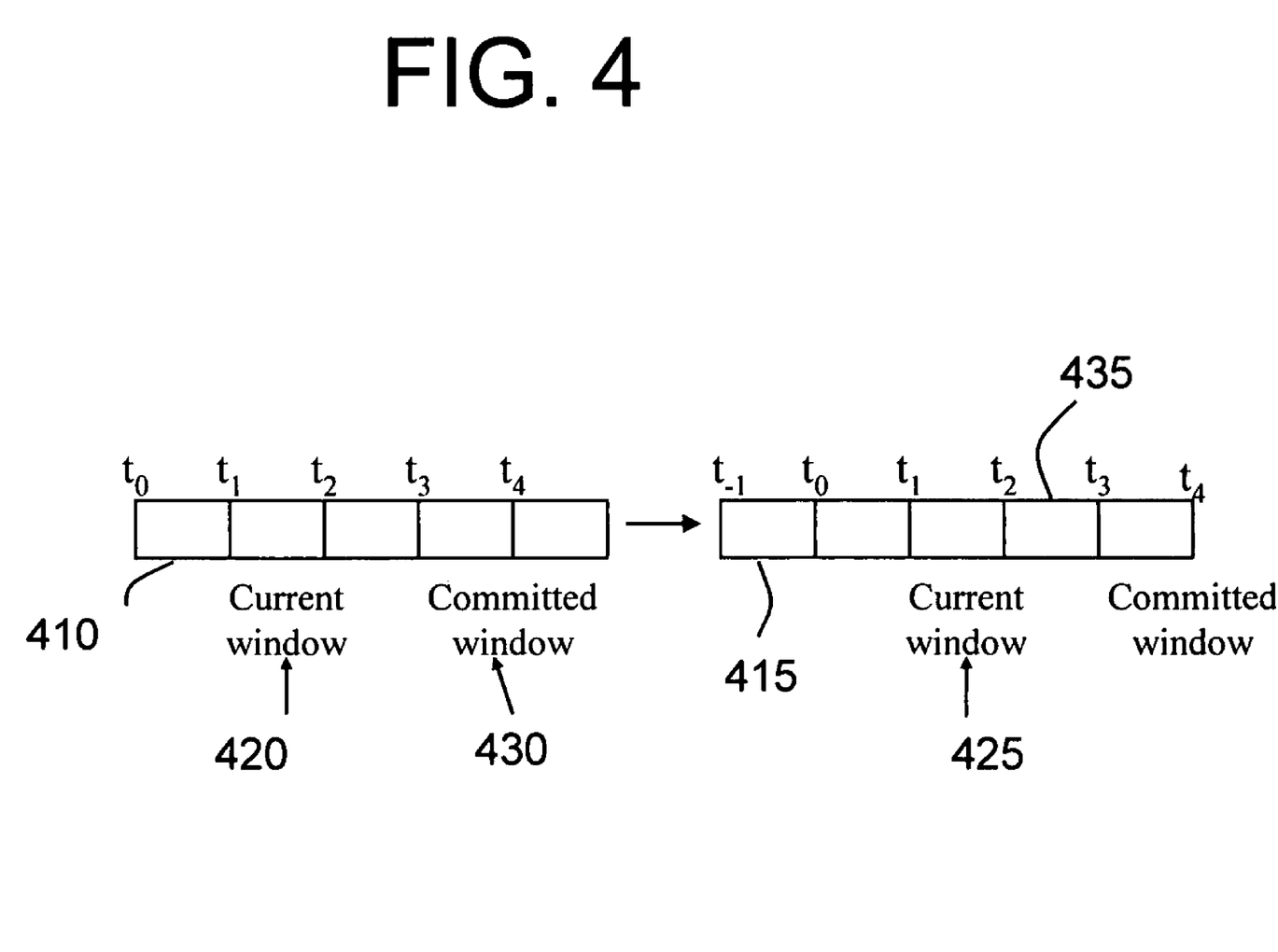
FIG. 4 is an exemplary diagram of the SDR of FIG. 1 depicting an exemplary sliding scheduling window.

An example embodiment of a SDR avionics system showing components of a SDR included in the avionics system is described below in connection with FIG. 2. Descriptions of the processes associated with the operation of the SDR avionics system are shown in FIGS. 3 and 4. More specific embodiments of SDRs that are configured to comply with example regulatory and certification operational requirements for communication, navigation and surveillance (CNS) airborne systems while minimizing redundancy of avionics components and functions, are described further below in accordance with exemplary embodiments.

Figure 2:
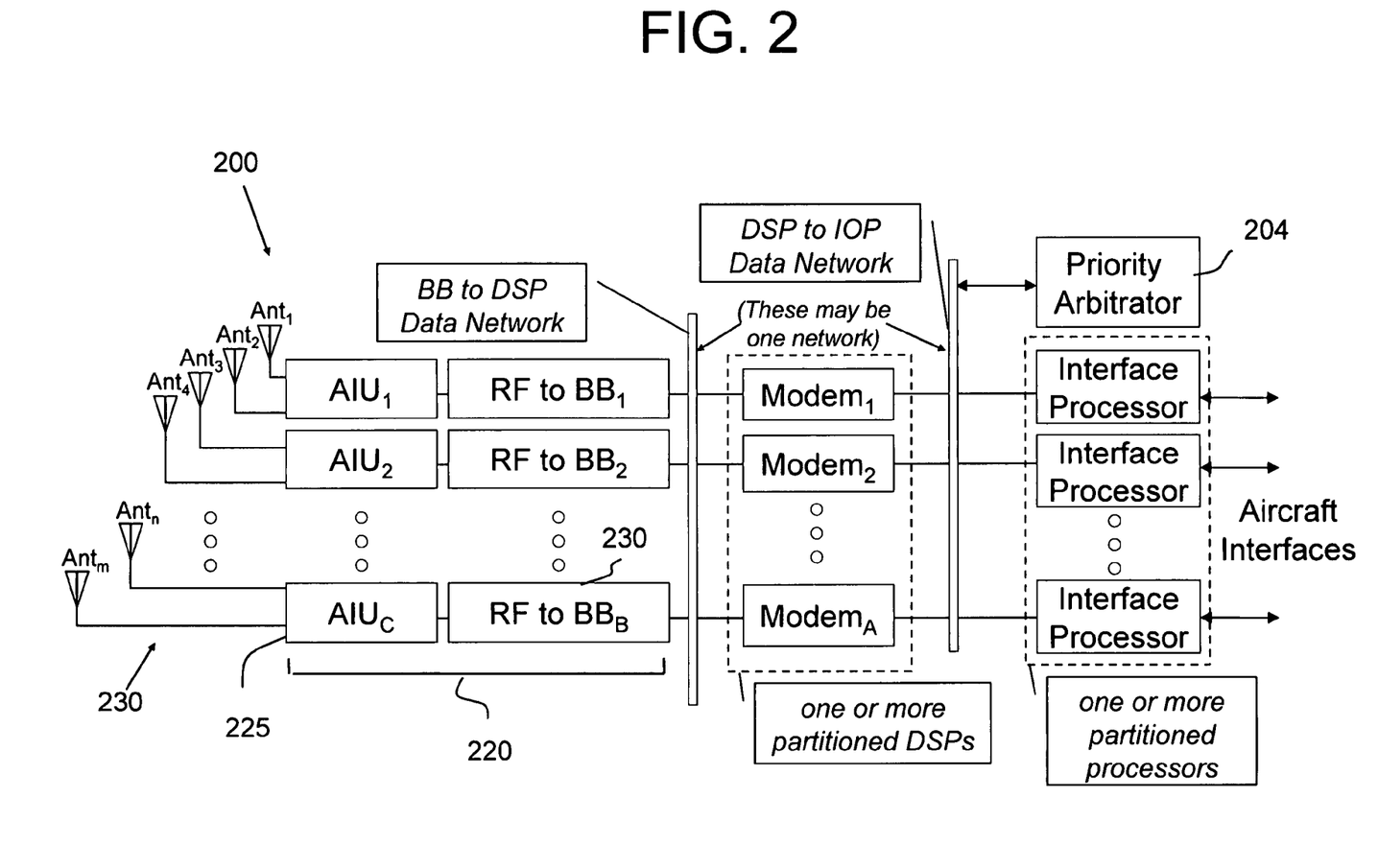
FIG. 2 is an exemplary block diagram of the SDR of FIG. 1 depicting an exemplary configuration.

FIG. 2 is a diagrammatic illustration of multiple SDRs included in SDR avionics system 102. In FIG. 2, SDR 200 is connected to an antenna group translator 220 that serves as an interface between an antenna group 230 (which may be a part of sensor system 104) and SDR 200. Antenna group translator 220 may include multiple components including but not limited to one or more antenna interface units (AIU) 225 and one or more radio frequency (RF) to base band (BB) converters 230, which may include analog to digital (A/D) converters.

In general, SDR 200 includes interconnected hardware and software components that are collectively capable of performing a number of avionics functions and/or general communication functions. In accordance with an exemplary embodiment, SDR 200 is configured to minimize the number of avionics components while being able to meet all the functional, operational and regulatory requirements throughout all phases of the flight or mission. In an exemplary embodiment, the primary component of SDR 200 that helps minimize the number of avionics functions is a priority arbitrator 204. A priority arbitrator is a component or function configured to receive priority control parameters and, based on the condition of the system and the received parameters, direct the one or more configurable SDR function implementations to their next state.

In accordance with an exemplary embodiment SDR 200 may be configured to carry out a plurality of functions, including but not limited to avionics functions. Examples of avionics functions are an instrument landing system (ILS), a traffic alert collision avoidance system (TCAS), a high frequency (HF) communication function, a very high frequency (VHF) communication function, a glide slope (GS) function, a localizer (Loc) function, a VHF omnidirectional range (VOR) function, an automatic direction finder (ADF), a marker beacon (MB) function, a global navigation satellite system (GNSS) function, distance measuring equipment (DME) function, Mode-S message communication function (message formats that include TCAS coordination), an aviation satellite communication system (SATCOM) function, a low range radio altimeter (LRRA) function, a microwave landing system (MLS) receiver function, a GPS wide area augmentation system (WAAS) receiver function and a GPS local area augmentation system (LAAS) receiver function. SDR 200 typically includes one or more receivers and may also include one or more transmitters.

In general, SDR 200 may be configured to implement each of the set of avionics functions (such as the functions listed above) in multiple pre-analyzed (e.g., deterministic) configurations. The avionics function configurations may be identified in advance and analyzed to determine that the behavior of the configurations is satisfactory for critical system operation. The results of this process may be stored for later retrieval by the priority arbitrator 204 at the appropriate time. Each of the multiple pre-analyzed configurations includes a particular predetermined priority-based subset of the set of avionics functions. Each pre-analyzed configuration (or priority-based subset) of avionics functions is typically a set of avionics functions that is analyzed, prioritized and certified by regulatory authorities such as the Federal Aviation Administration (FAA). The bases for forming different priority-based subgroups or subsets of avionics functions are discussed below.

In an alternate implementation, avionics function configurations may be generated by any process in a computer in the software defined radio avionics system 102 that includes methods for determination of avionics function configurations that meet certification criteria or other criteria.

The necessary configurations of different subsets of the set of avionics functions vary according to a phase of flight (dispatch, en-route, approach, etc.), mission, etc., of an aircraft. For example, the ILS is unnecessary during the en-route phase but may be necessary during the approach phase of flight of the aircraft. SDR circuitry is configured such that its resources can be re-allocated depending upon the operational needs of the aircraft's phase of flight stage, for example. Priority arbitrator 204 helps in directing SDR circuitry to re-allocate its resources. Specifically, priority arbitrator 204, which can include hardware, software and firmware, is configured to receive priority control parameters and, based on a make-up of received priority control parameters, responsively direct configurable avionics function implementation circuitry to implement a particular configuration of the avionics functions. The combination of priority arbitrator 204 and configurable avionics function implementation circuitry operates in a deterministic manner (i.e., they form a system whose output is uniquely determined by a make-up of the inputs to and operational status of the system).

As noted above, priority arbitrator 204 directs configurable avionics function implementation SDR circuitry to implement a particular configuration of the avionics functions based on a make-up of priority control parameters that are input to priority arbitrator 204. As mentioned earlier, different combinations of avionics functions are usually required for different phases of flight of an aircraft 100 and therefore priority control parameters that contribute to determining which of the avionics functions are implemented, often relate to at least one phase of flight of aircraft 100. Priority control parameters may relate only to a current phase of flight of aircraft 100, or may relate to a current phase of flight and/or one or more previous or next phases of flight of the aircraft 100. Parameters related to the next phase(s) of flight of an aircraft help priority arbitrator 204 and configurable avionics function implementation circuitry "look ahead" and thereby allocate or re-allocate resources in a manner that ensures a proper transition from one phase of flight to another as well as determine how to assign such resources.

In accordance with an exemplary embodiment, a bounded dynamic architecture in the waveform allocation for the SDR is used. By employing a Bounded Dynamic architecture in the Waveform Allocation, it is possible to be more optimal in assigning functions to SDR modules. Without using a dynamic architecture, the likely scenario would be to determine a maximum number of modules required to support every radio function needed during each phase of flight. A generic example is shown in Table I.

TABLE I

| Radio Type | Flt Phase 1 | Flt Phase 2 | Flt Phase 3 | Flt Phase 4 | Max/Phase |
|---|---|---|---|---|---|
| Radio A |   |   | 1 | 1 | 1 |
| Radio B |   |   | 1 |   | 1 |
| Radio C |   | 2 | 2 |   | 2 |
| Radio D | 1 | 1 | 2 |   | 2 |
| Radio E | 2 | 2 | 2 |   | 2 |
| Radio F |   |   | 1 | 1 | 1 |
| Radio G |   | 1 |   | 1 | 1 |
| Radio H | 2 |   | 1 | 2 | 2 |
| Radio I | 1 | 1 |   |   | 1 |
| Total/Phase | 6 | 7 | 10 | 5 | 13 |

From the example of Table I it can be seen that if no reconfiguration is possible (as in a federated radio system) the number of radios required is 13. If reconfiguration is allowed and managed by a statically defined methodology, the number of SDR radios is 10 due to the requirements of phase 3.

If it were possible to dynamically allocate resources depending on the changing needs of the system over time throughout each phase, the number of SDR resources could be further reduced. In effect, this constitutes dividing each phase into smaller intervals of time which can be evaluated by a trusted high integrity arbitration module. This module would use bounded criteria to determine the transitions that are allowable and meet specified predetermined criteria by well defined rules.

A Bounded Dynamic Waveform Priority Allocation device evaluates system conditions on defined intervals and schedules resource allocation for time intervals in the future. The system starts with a planned flight scenario and adjusts this plan as operational needs and system or environmental changes arise due to a variety of circumstances. An example timeline for scheduling a specific module is depicted in FIG. 3.

A sliding window (see for example FIG. 4, and further discussed below) is used to schedule reconfiguration of a module to minimize impact to the overall system. Past windows 310 cannot be changed. In an exemplary embodiment, sub-frames 315 within a current window 320 also cannot be changed because this may cause an interruption of service within the system. In an exemplary embodiment, the next window 330 may be considered committed and cannot be changed, but can be rescheduled. This restriction is due to the reconfiguration time of the SDR elements. All windows beyond the committed window 340 can be both rescheduled and reallocated to be a different configuration than originally planned.

The sub-frames 315 within each window can be described as the points in the schedule when a module can start or stop operation under its existing configuration. The larger window size can be determined to be the worst case time to reprogram a module to change its configuration. The windows can be implemented on a sliding time scale as depicted in the example diagram of FIG. 4.

As one sub-frame 410 expires it becomes a past frame 415 and the current window 420 slides to become new current window 425 and include the first sub-frame 435 of the previously committed window 430. The number of sub-frames and frame size is given above as a generic example and is therefore not limited to those sizes. System needs will be used to determine the sizes and number of frames to include in each window as the system is being designed.

The rules for allowing changes must be well defined and bounded. The bounding should include, but not be limited to such system requirements as waveform priority, criticality of each function, number of healthy SDRs in the system, phase of flight, available waveforms in the immediate area, available waveforms in the planned flight path of the aircraft, distance/time before entering a new phase of flight, planned approach, etc.

While the detailed drawings, specific examples, and particular formulations given described exemplary embodiments, they serve the purpose of illustration only. It should be understood that various alternatives to the embodiments of the invention described maybe employed in practicing the invention. It is intended that the following claims define the scope of the invention and that structures within the scope of these claims and their equivalents be covered thereby. The hardware and software configurations shown and described may differ depending on the chosen performance characteristics and physical characteristics of the computing and analysis devices. For example, the type of computing device, communications bus, or processor used may differ. The systems shown and described are not limited to the precise details and conditions disclosed. Method steps provided may not be limited to the order in which they are listed but may be ordered any way as to carry out the inventive process without departing from the scope of the invention. Furthermore, other substitutions, modifications, changes and omissions may be made in the design, operating conditions and arrangements of the exemplary embodiments without departing from the scope of the invention as expressed in the appended claims.

The invention claimed is:

1. In a Software Defined Radio, a method using at least one electronic processor for resource allocation, the method comprising the steps of:
    defining a current time window, the current time window being subdivided into sub time intervals using the at least one electronic processor;
    defining a committed time window following the current time window using the at least one electronic processor, the committed time window being subdivided into sub time intervals using the at least one electronic processor, the committed time window being configured to be reschedulable, the committed time window further configured to not be able to be reallocated to a different configuration; and
    defining a future time window following the current time window using the at least one electronic processor, the future time window being subdivided into sub time intervals, the future time window being configured to be reschedulable and to be reallocatable to the different configuration;
    wherein a size of each of the windows and a size and number of the sub time intervals is based on the output of a priority arbitration function.

2. The Software Defined Radio of claim 1, further comprising:
    determining whether committed events in the sub time intervals of the committed time window should be rescheduled.

3. The Software Defined Radio of claim 2, further comprising rescheduling the committed events in sub time intervals to the future time window.

4. The Software Defined Radio of claim 1, further comprising:
    providing a priority arbitrator for scheduling resource allocations, the priority arbitrator being a subsystem of the Software Defined Radio.

5. The Software Defined Radio of claim 1, wherein the Software Defined Radio is part of a communication, navigation and surveillance System.

6. The Software Defined Radio of claim 1, wherein the Software Defined Radio is an avionics Software Defined Radio.

7. The Software Defined Radio of claim 1, wherein the Software Defined Radio is a ground-based military radio.

8. The Software Defined Radio of claim 1, wherein the Software Defined Radio is a portable military radio.

9. The Software Defined Radio of claim 1, wherein the Software Defined Radio is a space based radio.

10. A method of dynamically scheduling resources in a software defined radio, comprising:
    providing a priority arbitrator to define a schedule for changing resource allocations;
    determining by the priority arbitrator when resources will be changed within at least one of a plurality of defined time subintervals of a committed time window and a future time window and determining by the priority arbitrator a size for each of the windows and a size and number of the time subintervals, the committed time window being configured to be reschedulable, the committed time window further configured to not be able to be reallocated to a different configuration, the future time window being configured to be reschedulable and to be reallocatable to the different configuration;
    reconfiguring at least one radio channel in accordance with the schedule; and
    sending a signal using the at least one radio channel to a second radio channel.

11. The method of claim 10, further comprising:
    determining whether committed events in the sub timing intervals of the committed time window should be rescheduled.

12. The method of claim 11, further comprising rescheduling the committed events in sub time intervals to the future time window.

13. The method of claim 10, further comprising:
    the priority arbitrator allocating resources based on an aircraft phase of flight.

14. The method of claim 10, wherein the Software Defined Radio is a part of a communication, navigation and surveillance system.

15. The method of claim 10, wherein the Software Defined Radio is an avionics Software Defined Radio.

16. The method of claim 10, wherein the Software Defined Radio is a ground-based military radio.

17. The method of claim 10, wherein the Software Defined Radio is a portable military radio.

18. The method of claim 10, wherein the Software Defined Radio is a space based radio.

19. A software defined radio, comprising:
- a modem at least partially defined by software running on a processor;
- an antenna group translator coupled to the modem;
- at least two antennas coupled to the antenna group translator; and
- a program stored in a memory and running on the processor, the program configured to define a committed time window and a future time window each being subdivided into sub time intervals, the committed time window being configured to be reschedulable, the committed time window further configured to not be able to be reallocated to a different configuration, the future time window being configured to be reschedulable and to be reallocatable to the different configuration;
- determining the changes in resource allocations in the sub time intervals of the future time window based on the output of a priority arbitration function.

20. The software defined radio of claim 19, wherein the software defined radio is configured to provide flight certified service.

21. The software defined radio of claim 19, wherein the software defined radio is configured to minimize the number of antennas needed by a system using the software defined radio.

22. The software defined radio of claim 19, wherein the software defined radio is configured to carry out communication, navigation, and surveillance.

23. The software defined radio of claim 19, wherein the functions of the software defined radio are changed according to the flight phase.

24. The software defined radio of claim 19, wherein the program is executed automatically prior to reconfiguration.

25. The software defined radio of claim 19, wherein the program is configured to be used for ground-based testing and analysis.

\* \* \* \* \*